(12) United States Patent
Yoon

(10) Patent No.: US 10,323,787 B2
(45) Date of Patent: Jun. 18, 2019

(54) ELEVATOR HANDRAIL SUPPORTING DEVICE

(71) Applicant: Il Shik Yoon, Seoul (KR)

(72) Inventor: Il Shik Yoon, Seoul (KR)

( * ) Notice: Subject to any disclaimer, the term of this patent is extended or adjusted under 35 U.S.C. 154(b) by 0 days.

(21) Appl. No.: 15/749,340

(22) PCT Filed: Jul. 11, 2016

(86) PCT No.: PCT/KR2016/007470
§ 371 (c)(1),
(2) Date: Jan. 31, 2018

(87) PCT Pub. No.: WO2017/034153
PCT Pub. Date: Mar. 2, 2017

(65) Prior Publication Data
US 2018/0224060 A1    Aug. 9, 2018

(30) Foreign Application Priority Data

Aug. 27, 2015    (KR) .................. 10-2015-0120983

(51) Int. Cl.
*F16M 13/00* (2006.01)
*F16M 13/02* (2006.01)
*F16B 9/02* (2006.01)
*B66B 11/02* (2006.01)
*F16B 7/04* (2006.01)

(52) U.S. Cl.
CPC ......... *F16M 13/02* (2013.01); *B66B 11/0226* (2013.01); *F16B 9/02* (2013.01); *F16B 7/0453* (2013.01)

(58) Field of Classification Search
CPC .................. E04F 11/1812; E04F 11/1834; E04F 11/1817
USPC ........... 248/214, 220.21, 223.41, 224.8, 251; 256/59, 65.01, 65.16
See application file for complete search history.

(56) References Cited

U.S. PATENT DOCUMENTS

| | | | | |
|---|---|---|---|---|
| 3,372,909 A | * | 3/1968 | Attaway ............... | E04F 11/181 256/21 |
| 3,544,072 A | * | 12/1970 | Wenzel ............... | E04F 11/1804 256/59 |
| 5,127,131 A | * | 7/1992 | Corrigan ............... | B64G 1/641 16/422 |
| 5,544,865 A | * | 8/1996 | Abbaticchio ....... | E04F 11/1804 256/65.08 |
| 8,356,802 B2 | * | 1/2013 | Reich ............... | E04F 11/1836 256/65.09 |

* cited by examiner

*Primary Examiner* — Steven M Marsh
(74) *Attorney, Agent, or Firm* — Richard John Bartz

(57) ABSTRACT

The present invention relates to an elevator handrail supporting device including: a fixing plate assembly 20 and a bracket 50 coupled to the fixing plate assembly, in which the bracket includes T-nut guides 60, a T-nut 70 coupled to the T-nut guides, a stopper 80 being in contact with a bolt head, a bolt support 90, and a catching projection 96, and when the bracket 50 is fitted with the fixing plate assembly 20 coupled to a handrail 10, a stepped portion 94 of the catching projection 96 is engaged with and coupled to a catching hole 24, a bolt is fitted into a fastening hole 22, and then the bolt is tightened into a threaded hole 76 of the T-nut 70, the fixing plate assembly 20 is bent downward by elasticity so as to apply an upward force to the handrail 10.

2 Claims, 3 Drawing Sheets

[Fig. 1]
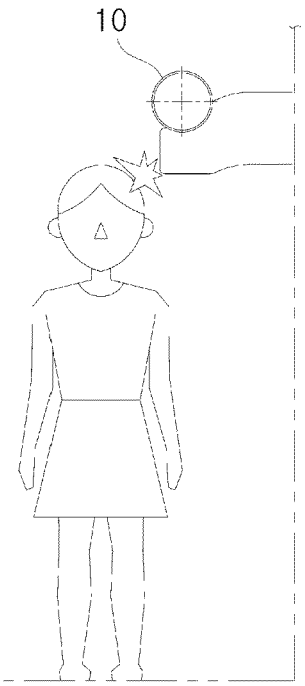
[Fig. 2]
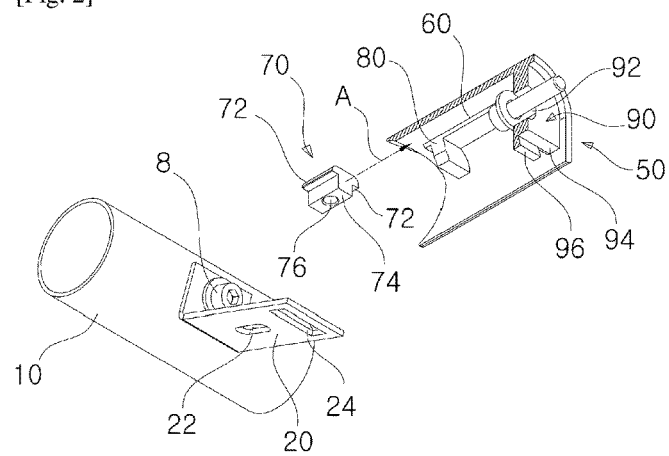
[Fig. 3]
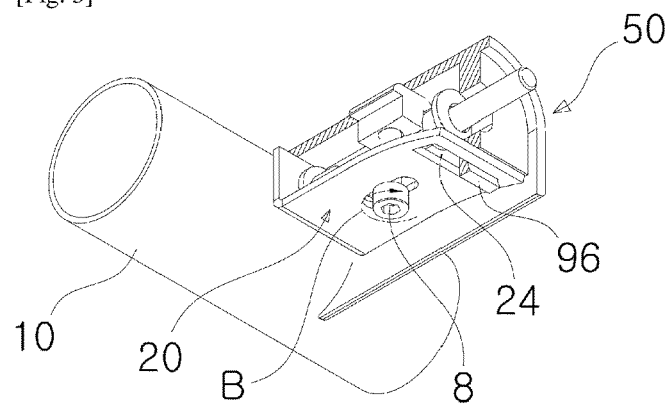

[Fig. 4]
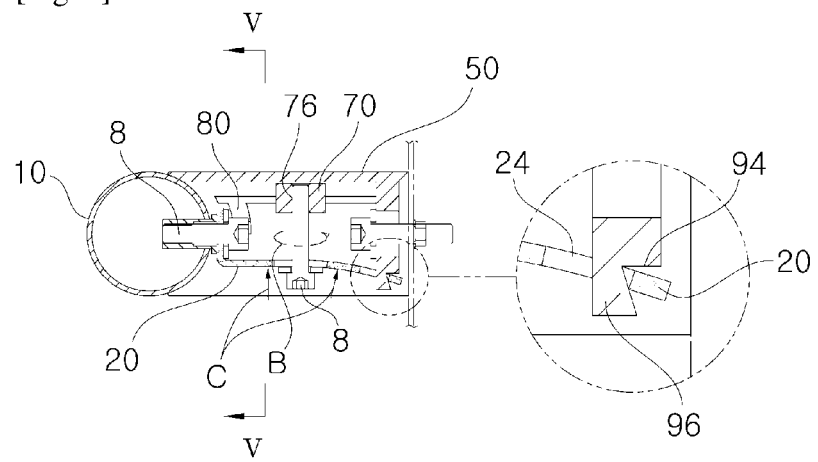
[Fig. 5]
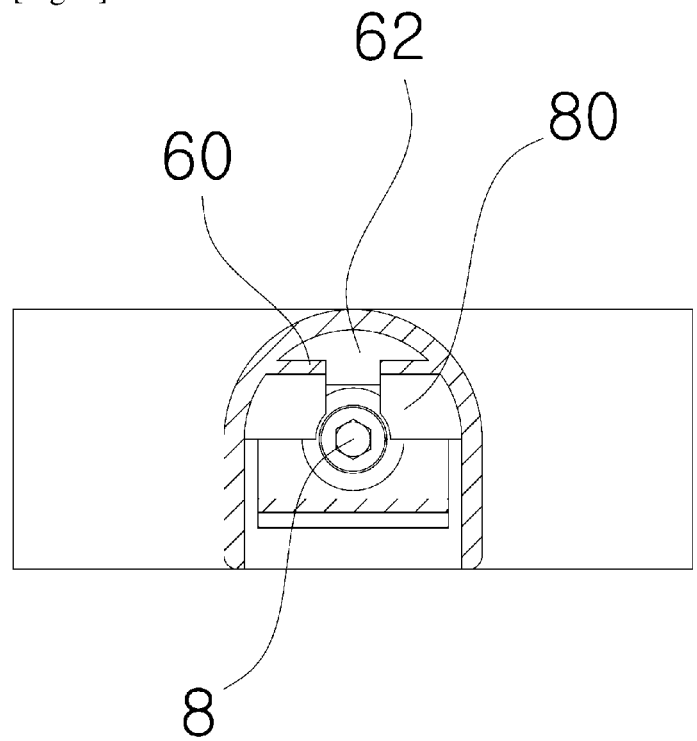

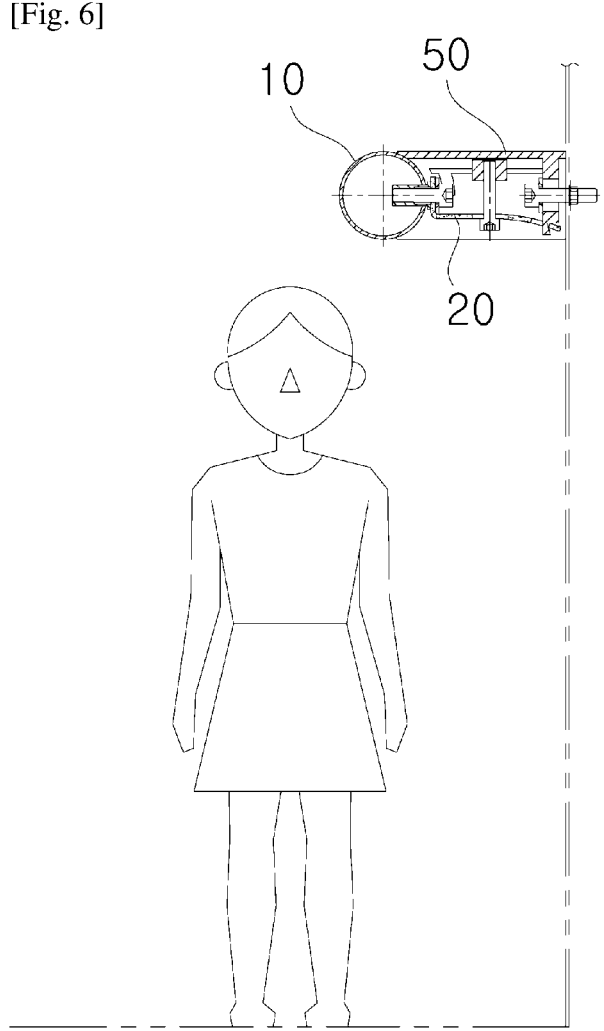
[Fig. 6]

ELEVATOR HANDRAIL SUPPORTING DEVICE

TECHNICAL FIELD

The present invention relates to an elevator handrail supporting device, and particularly, to a device for supporting a handrail only laterally instead of supporting the handrail at a lower side of the handrail.

BACKGROUND ART

FIG. 1 is a view illustrating an example in which a handrail in the related art, which a passenger holds by hand, is supported in an elevator cage, and illustrating a problem with the handrail.

Passengers, particularly, adult persons in an elevator often usually hold the handrail by hand. In this case, the handrail is inevitably pushed downward due to a weight of the passenger, and for this reason, in the case of adopting a structure in which the handrail of the elevator is not supported at a lower side of the handrail, the handrail is bent downward from the original position. To prevent the handrail from being bent downward, most of the elevator handrails in the related art have a structure that supports a handrail 10 below the handrail 10, as illustrated in FIG. 1. The structure withstands a force of the passenger that pushes the handrail downward, thereby maintaining the original position of the handrail. However, when a small infant or child gets in the elevator, the infant or child often collides with an edge of a support portion at a lower end of the handrail, as illustrated in FIG. 1. The edge of the support portion at the lower end of the handrail is often sharp and has a right angle due to structural properties thereof, and for this reason, there may be a dangerous problem in that the child's head is severely injured when the child collides with the edge of the support portion at the lower end of the handrail.

DISCLOSURE

Technical Problem

The present invention has been made in consideration of the problems in the related art, and a main object of the present invention is to prevent an accident by allowing a handrail to be supported only laterally and thus preventing the handrail from being brought into contact with a small child's head.

Another object of the present invention is to minimize an injury to a child's head by allowing the child's head to come into contact with only a circular curved surface instead of a sharp edge even in a case in which the child is at a height that may collide with a handrail.

Still another object of the present invention is to prevent a handrail from being bent downward due to downward pressure, even though the handrail is supported only laterally.

Technical Solution

The aforementioned objects of the present invention are achieved by an elevator handrail supporting device including: a fixing plate assembly 20 which is fixed, by a bolt 8, to a circumferential surface of a cylindrical handrail 10 installed in an elevator cage, has an L-shaped cross section, has a fastening hole 22 and a catching hole 24 penetratively formed at a center of a bottom surface and at an edge of the fixing plate assembly 20, respectively, and has elasticity; and a bracket 50 which is coupled to the fixing plate assembly 20, has an inverted U-shaped cross section, has one end portion having a curved line coincident with a circumferential surface of the handrail 10 in a coupled state, and has the other end portion coupled to a wall surface of the elevator cage, in which the bracket includes: T-nut guides 60 which are horizontally disposed with a space formed between the T-nut guides 60 and an inner upper end portion of the bracket, have a guide slot 62 at a center in a longitudinal direction, and are disposed in a plate shape at both sides of the guide slot; a T-nut 70 which is moved along the guide slot 62 of the T-nut guides 60, has a main body 74 inserted into the guide slot, wings 72 horizontally protruding at both sides of an upper end of the main body, and a threaded hole 76 vertically formed in the main body 74, and has a T-shaped cross section; a stopper 80 which protrudes downward at one end portion of the T-nut guide 60, and is in contact with a bolt head of the bolt 8 for fixing the fixing plate assembly 20 to the handrail 10 in an assembled state; a bolt support 90 which is vertically formed in the bracket in the vicinity of an end portion of the bracket 50 opposite to the handrail, and has a hole 92 sized to allow a main body of a fastening bolt to pass therethrough and a bolt head of the fastening bolt to be caught; and a catching projection 96 which vertically protrudes at a lower end portion of the bolt support 90, has a stepped portion 94 formed at a connecting portion between the catching projection 96 and the lower end portion of the bolt support, and protrudes downward from the catching hole 24 in the assembled state in a state in which the stepped portion 94 is caught by the catching hole 24 of the fixing plate assembly 20, and when the bracket 50 is fitted with the fixing plate assembly 20 coupled to the handrail 10, the stepped portion 94 of the catching projection 96 is engaged with and coupled to the catching hole 24, the bolt is fitted into the fastening hole 22, and then the bolt is tightened into the threaded hole 76 of the T-nut 70, such that the fixing plate assembly 20 is bent downward by elasticity so as to apply an upward force to the handrail 10.

According to the present invention, a groove, which is shaped to correspond to the bolt head of the bolt 8, may be formed at a lower end of the stopper 80.

Advantageous Effects

According to the handrail supporting device of the present invention which is configured as described above, it is possible to greatly reduce a risk that a small child's head collides with the handrail or accessories of the handrail and gets injured because there is no protruding portion below the handrail, it is possible to prevent the handrail from being bent downward, and it is possible to easily perform a process of disassembling and assembling the handrail and to ensure safety of an operator because the handrail may be disassembled and assembled in the elevator cage.

DESCRIPTION OF DRAWINGS

FIG. 1 is a view illustrating a problem with a handrail in the related art.

FIG. 2 is an exploded perspective view of an elevator handrail supporting device according to the present invention, which illustrates only a half of a bracket which is an upper assembly.

FIG. 3 is a lower perspective view illustrating an assembled state.

FIG. 4 is a cross-sectional view and an enlarged view of a main part of the assembled state.

FIG. 5 is a cross-sectional view taken along line V-V in FIG. 4.

FIG. 6 is a view illustrating a situation in which a handrail is assembled to a wall surface of an elevator by using the device of the present invention and a child is in an elevator.

BEST MODE

FIG. 2 is an exploded perspective view of an elevator handrail supporting device for an elevator handrail 10 according to the present invention, and FIG. 2 illustrates only a half of a bracket 50, which is an upper assembly, because the bracket 50 has a symmetric structure.

As illustrated, a fixing plate assembly 20 is fixed, by a bolt 8, to a circumferential surface of the cylindrical handrail 10 installed in an elevator cage. The fixing plate assembly 20 has an L-shaped cross section when viewed from a lateral side, and a fastening hole 22 and a catching hole 24 are penetratively formed at a center of a bottom surface and at an edge of the fixing plate assembly 20, respectively. The catching hole 24 may have a rectangular shape. In addition, the fixing plate assembly 20 may have elasticity for supporting the handrail 10 upward, and the function of elasticity will be described below.

The bracket 50 is coupled above the fixing plate assembly 20. The bracket entirely has an inverted U-shaped cross section when viewed in a direction of the handrail, one end portion of the bracket at the handrail side has a curved line coincident with the circumferential surface of the handrail 10, and the other end portion opposite to the one end portion is coupled to a wall surface of the elevator cage.

T-nut guides 60 are horizontally formed in the bracket with a space formed between the T-nut guides 60 and an inner upper end portion of the bracket. The T-nut guides 60 have a guide slot 62 at a center in a longitudinal direction, and are disposed in a plate shape at both sides of the guide slot 62 (see FIG. 5). As described above, FIG. 2 illustrates only a half of the T-nut guide 60.

A T-nut 70 having a T-shaped cross section is disposed to be moved along the guide slot 62 of the T-nut guides 60. The T-nut 70 has a main body 74 which is inserted into the guide slot, wings 72 which horizontally protrude at both sides of an upper end of the main body, and a threaded hole 76 which is vertically formed in the main body 74. The T-nut 70 is fitted into the T-nut guides 60, specifically, into the guide slot 62 of the T-nut guides 60 in the direction indicated by the arrow A in the drawing.

A stopper 80 is formed to protrude downward at one end portion of the T-nut guide 60 at the handrail side. In the assembled state, the stopper 80 is in contact with a bolt head of the bolt 8 that fixes the fixing plate assembly 20 to the handrail 10 (see FIGS. 4 and 5). As can be seen from FIGS. 4 and 5, the stopper 80 comes into contact with the bolt head of the bolt 8 during the assembly process, and as a result, the bracket 50 and the fixing plate assembly 20 may be coupled to each other while maintaining a predetermined interval. To this end, a groove, which is shaped to correspond to the bolt head, may be particularly formed in the stopper 80.

A bolt support 90 is vertically formed in the bracket in the vicinity of an end portion of the bracket 50 which is opposite to the handrail. The bolt support 90 has a partition plate shape, and a hole 92, which is sized to allow a main body of a fastening bolt to pass therethrough and a bolt head of the fastening bolt to be caught, is penetratively formed at a center of the bolt support 90.

A catching projection 96 vertically protrudes at a lower end portion of the bolt support 90, and a stepped portion 94 is formed at a connecting portion between the lower end portion of the bolt support and the catching projection 96.

As can be seen from FIG. 4, in the assembled state, the stepped portion 94 protrudes downward from the catching hole 24 in a state in which the stepped portion 94 is caught by the catching hole 24 of the fixing plate assembly 20.

FIG. 3 is a lower perspective view illustrating the assembled state, which illustrates only a half of the bracket for convenience of description, and FIG. 4 is a cross-sectional view (indicated by a circle with alternate long and two short dashes) and an enlarged view of a main part of the assembled state.

As illustrated, the bracket 50 is fixed to the wall surface of the elevator by the bolt, the bracket 50 is fitted with the fixing plate assembly 20 coupled to the handrail 10, the stepped portion 94 of the catching projection 96 is engaged with and coupled to the catching hole 24, the bolt 8 is fitted into the fastening hole 22, and then the bolt 8 is tightened into the threaded hole 76 of the T-nut 70 in a direction indicated by the arrow B, such that the bolt head of the bolt 8 pushes the fixing plate assembly 20 upward in a direction indicated by the arrow C while the bracket 50 maintains its posture by the stopper 80, and the remaining portion of the fixing plate assembly is bent downward by elasticity. The fixing plate assembly pushes the handrail 10 upward by elasticity in the state in which the fixing plate assembly is bent, and as a result, it is possible to prevent the handrail from being bent downward even though the passenger applies a downward force to the handrail by hand.

FIG. 5 is a cross-sectional view taken along line V-V in FIG. 4, and it can be clearly seen that the stopper 80 is in contact with the bolt head of the bolt 8 during the assembly process.

FIG. 6 is a view illustrating a situation in which the handrail is assembled to the wall surface of the elevator by using the device of the present invention and a child is in the elevator.

As illustrated, it is possible to prevent a risk that a small child collides with the handrail or accessories of the handrail and gets injured because there is no protruding portion below the handrail.

In addition, it is possible to very easily perform a process of disassembling and assembling the handrail supporting device of the present invention and to ensure safety of an operator because the handrail supporting device may be disassembled and assembled in the elevator cage.

The invention claimed is:

1. An elevator handrail supporting device comprising:
a fixing plate assembly 20 which is fixed, by a bolt 8, to a circumferential surface of a cylindrical handrail 10 installed in an elevator cage, has an L-shaped cross section, has a fastening hole 22 and a catching hole 24 penetratively formed at a center of a bottom surface and at an edge of the fixing plate assembly 20, respectively, and has elasticity; and
a bracket 50 which is coupled to the fixing plate assembly 20, has an inverted U-shaped cross section, has a first end portion having a curved line coincident with a circumferential surface of the handrail 10 in a coupled state, and has a second end portion coupled to a wall surface of the elevator cage,
wherein the bracket includes:
T-nut guides 60 which are horizontally disposed with a space formed between the T-nut guides 60 and an inner upper end portion of the bracket, have a guide slot 62 at a center in a longitudinal direction, and are disposed in a plate shape at both sides of the guide slot;

a T-nut 70 which is moved along the guide slot 62 of the T-nut guides 60, has a main body 74 inserted into the guide slot, wings 72 horizontally protruding at both sides of an upper end of the main body, and a threaded hole 76 vertically formed in the main body 74, and has a T-shaped cross section;

a stopper 80 which protrudes downward at one end portion of the T-nut guide 60, and is in contact with a bolt head of the bolt 8 for fixing the fixing plate assembly 20 to the handrail 10 in an assembled state;

a bolt support 90 which is vertically formed in the bracket in the vicinity of an end portion of the bracket 50 opposite to the handrail, and has a hole 92 sized to allow a main body of a fastening bolt to pass therethrough and a bolt head of the fastening bolt to be caught; and a catching projection 96 which vertically protrudes at a lower end portion of the bolt support 90, has a stepped portion 94 formed at a connecting portion between the catching projection 96 and the lower end portion of the bolt support, and protrudes downward from the catching hole 24 in the assembled state in a state in which the stepped portion 94 is caught by the catching hole 24 of the fixing plate assembly 20, and when the bracket 50 is fitted with the fixing plate assembly 20 coupled to the handrail 10, the stepped portion 94 of the catching projection 96 is engaged with and coupled to the catching hole 24, the bolt is fitted into the fastening hole 22, and then the bolt is tightened into the threaded hole 76 of the T-nut 70, such that the fixing plate assembly 20 is bent downward by elasticity so as to apply an upward force to the handrail 10.

2. The elevator handrail supporting device of claim 1, wherein a groove, which is shaped to correspond to the bolt head of the bolt 8, is formed at a lower end of the stopper 80.

* * * * *